(12) United States Patent
Fricker

(10) Patent No.: US 7,021,408 B2
(45) Date of Patent: Apr. 4, 2006

(54) CARRIAGE

(76) Inventor: Siegfried Fricker, Wacholderweg 27, Heimsheim (DE) 71296

( * ) Notice: Subject to any disclaimer, the term of this patent is extended or adjusted under 35 U.S.C. 154(b) by 0 days.

(21) Appl. No.: 10/709,559

(22) Filed: May 13, 2004

(65) Prior Publication Data
US 2004/0206556 A1 Oct. 21, 2004

Related U.S. Application Data

(63) Continuation of application No. PCT/DE03/01267, filed on Apr. 15, 2003.

(30) Foreign Application Priority Data
Apr. 20, 2002 (DE) .................................. 102 17 764

(51) Int. Cl.
*B62D 51/04* (2006.01)
(52) U.S. Cl. .............................. 180/19.1; 280/DIG. 6; 280/DIG. 5
(58) Field of Classification Search ................ 180/19.1, 180/19.2, 19.3, 65.1, 208, 908, 11, 12, 13, 180/68.5; 280/DIG. 6, DIG. 5
See application file for complete search history.

(56) References Cited

U.S. PATENT DOCUMENTS

| | | | |
|---|---|---|---|
| 2,803,469 A * | 8/1957 | Pfisterer ...................... 280/38 |
| 4,017,091 A * | 4/1977 | Wallen ......................... 280/30 |
| 4,846,295 A * | 7/1989 | Shepard et al. ............. 180/68.5 |
| 5,632,496 A * | 5/1997 | Nelson ......................... 280/30 |
| 5,747,965 A * | 5/1998 | LaPointe et al. ............. 320/112 |
| 5,857,684 A | 1/1999 | Liao et al. ...................... 280/40 |
| 5,899,284 A * | 5/1999 | Reimers et al. ................ 180/11 |
| 6,168,174 B1 * | 1/2001 | MacDougall ............. 280/47.34 |
| 6,283,238 B1 | 9/2001 | Royer et al. ................ 180/19.1 |
| 6,390,216 B1 * | 5/2002 | Sueshige et al. ........... 180/65.5 |
| 6,474,427 B1 * | 11/2002 | Tunnecliff .................. 180/19.1 |
| 6,502,656 B1 * | 1/2003 | Weiss et al. ................. 180/168 |

FOREIGN PATENT DOCUMENTS

| | | |
|---|---|---|
| DE | 199 14 385 | 4/2000 |
| FR | 2 795 652 | 1/2001 |
| GB | 607 387 | 8/1948 |
| GB | 648 714 | 1/1951 |
| WO | 97/45311 | 12/1997 |

* cited by examiner

*Primary Examiner*—Frank Vanaman
(74) *Attorney, Agent, or Firm*—Gudrun E. Huckett

(57) ABSTRACT

A carriage for transporting a container has a chassis and at least three wheels connected to the chassis for supporting the chassis, wherein the at least three wheels include two rear wheels. A handlebar is connected to the chassis for guiding the carriage in a state of use, wherein the carriage can be converted from the state of use into a transport state. A handle is connected to the handle bar. The rear wheels are provided with halfshafts that are fastened detachably on the chassis. The chassis has securing elements for securing the rear wheels on the chassis in the transport state.

21 Claims, 14 Drawing Sheets

CARRIAGE

CROSS REFERENCE TO RELATED APPLICATIONS

This is a continuation of International Application PCT/DE03/01267 having international filing date of Apr. 15, 2003, not published in English under PCT Article 21(2).

BACKGROUND OF INVENTION

The invention relates to carriage for transporting a container, in particular, a caddie for a golf bag, comprising a chassis supported on at least three wheels, wherein two rear wheels are provided, and comprising a handle arranged on a handlebar for guiding the carriage in a state of use, wherein the carriage can be converted into a transport state.

DE 199 14 385 C1 discloses a golf cart whose drawbar is of a two-part configuration and can be folded onto a chassis frame. For transporting it, the rear wheels of the cart as well as the front guide wheel are removed. Such a golf cart has a minimal stability. When transporting it, several individual parts must be transported.

SUMMARY OF INVENTION

It is an object of the invention to provide a carriage of the aforementioned kind that has a high stability in the state of use and has a compact size in the transport state.

This object is solved in that the rear wheels are provided with halfshafts that are fastened detachably on the chassis and with means provided on the chassis with which the rear wheels are secured on the chassis in the transport state. The halfshafts of the rear wheels enable a great wheel spacing so that a sufficient stability is provided. In the transport state, the rear wheels are secured on the chassis. The carriage has therefore a compact size.

Advantageously, in the transport state the rear wheels are secured such that they rest on the chassis. Expediently, the chassis has a width that matches essentially the diameter of the rear wheel and has a length that is approximately twice the diameter of the rear wheel. In the transport state, the rear wheels thus do not project past the chassis.

Expediently, means for securing in the form of receptacles are provided on the chassis into which the halfshafts can be inserted. In this way, the halfshafts are safely secured and the rear wheels can be simply fixed on the chassis and released therefrom. Advantageously, the halfshafts are non-positively engaged in the receptacles.

In order to provide a minimal size in the transport state, it is provided that the handlebar has an upper section where a handle is arranged and a lower section that is secured on the chassis, wherein the two sections are collapsed onto the chassis in the transport state.

It is provided that the rear wheels in the transport state rest on the folded handlebar. The height of the carriage in the transport state is thus determined essentially by the height of the chassis, the diameter of the handlebar and the width of the rear wheels.

For providing great stability of the carriage in the state of use, it is provided that the handlebar is pivotably supported on the chassis and, in the state of use, can be secured without play on the chassis by means of a screw. In order to enable a simple and fast fixation and release of the handlebar, the screw is supported on the chassis expediently so that it is pivotable out of the area of the handlebar. In order to counteract a tilting tendency even in the case of inclined terrain, it is moreover provided that the carriage has two front wheels. The front wheels are advantageously secured on a frame element wherein the frame element is supported on the chassis on a pivot axis that extends transversely to the longitudinal direction of the chassis and, in the transport state, is folded toward the chassis. In this way, a minimal transport size can be realized. For a simple mounting and demounting of the rear wheels, it is provided that the halfshafts are secured by positive engagement by means of slide locks on the chassis wherein the slide locks are secured in particular on the gearbox housings provided on the chassis.

Advantageously, the carriage is driven by an electric motor wherein as an energy source a battery is provided that is removably arranged within a battery receptacle in the chassis. In the transport state, the battery can remain within the chassis. The size of the carriage in the transport state is not increased by the battery remaining within the chassis. Since the battery must not be removed, the carriage with battery can be transported as a complete unit. In order to reduce weight for the transport, it can be advantageous however to remove the battery from the chassis. Expediently, the battery is a rechargeable battery unit that has, in particular, a minimal weight. As safe and reliable contacting of the battery results by arranging bow contacts within the battery receptacle, wherein the poles of the battery rest on the bow contacts. Because of its own weight, the battery ensures a safe contacting action. The arrangement of the battery in the chassis leads to a low center of gravity of the carriage and thus to a high tilting stability. In order to ensure that the battery is not contacted in the transport state, it is provided that on the chassis a plug contact is arranged via which the battery is to be connected to the motor, wherein the plug contact is arranged immediately adjacent to a receptacle. In this way, it is prevented that, when the plug contact is plugged in, the halfshaft can be inserted into the receptacle. Advantageously, the motor drives the carriage by means of a gearbox that is arranged in a substantially closed gearbox housing. In this way, the gearbox is protected against soiling. The gear housing is particularly formed by a cover that is arranged externally on the carriage and a lid arranged within the chassis.

The front wheels have a diameter that matches maximally the total height combined of the height of the chassis and of the rear wheels secured on the chassis in the receptacles. In the transport state, the front wheels thus do not project past the compact package. Expediently, the frame element has a rest for the container wherein the rest for the container secures the battery in the transport state. Falling of the battery out of the carriage during transport is thus prevented without this requiring additional components. For providing a high stability of the carriage, it is provided that the frame element in the state of use is secured on the chassis without play by clamping it with a screw.

Expediently, on the handlebar an umbrella holder is arranged wherein the umbrella holder can serve as a holder for an umbrella acting as a sunshade or as rain protection. In order to provide a minimal transport size, the umbrella holder is rotated in the transport state by 90° about the longitudinal axis of the handle.

Expediently, on the handlebar an umbrella holder is arranged wherein the umbrella holder can serve as a holder for an umbrella acting as a sunshade or as rain protection. In order to provide a minimal transport size, the umbrella holder is rotated in the transport state by 90E about the longitudinal axis of the handle.

Advantageously, the chassis is formed of a substantially U-shaped sheet metal part wherein the end sections of the legs of the U are themselves U-shaped toward the interior of the U and, in this way, form longitudinal stays. In this way, a simple manufacture as well as a high stability of the chassis is provided. It is also provided that the rear wheels have in a rotational direction a freewheel action. In this way, a simple pulling or pushing even without using the motor is ensured.

A simple configuration results when the chassis is formed of two bent sheet metal parts that are riveted together. In particular, one sheet metal part forms a bottom element that is formed as a monolithic part to have a front wall and a rear wall and in that the other sheet metal part forms a frame that provides the top side and the sidewalls of the chassis.

DETAILED DESCRIPTION

Figure 1:
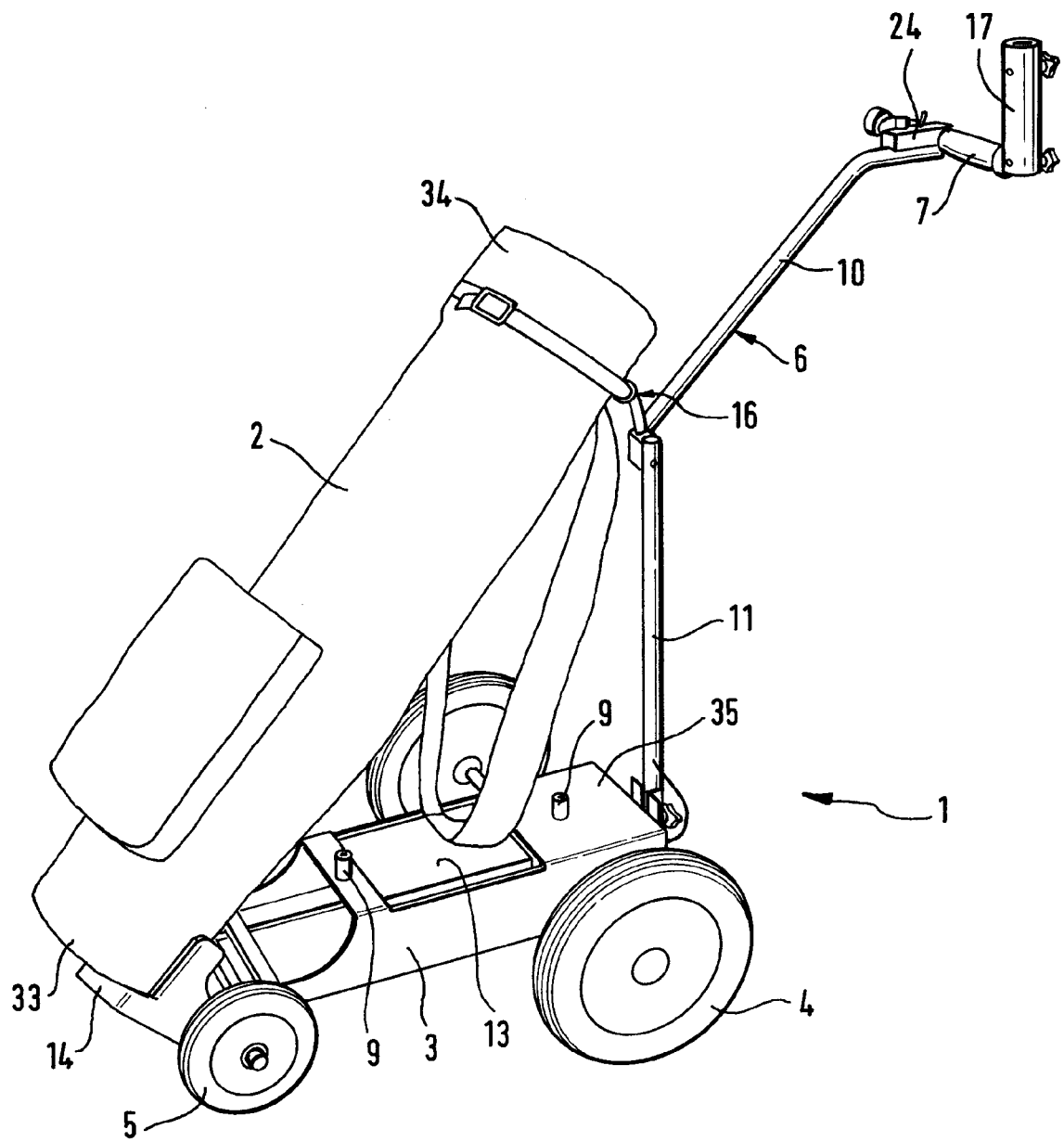
FIG. 1 is a perspective view of the caddie with a golf bag.

FIG. 1 shows a carriage for transporting a container, in this case a golf caddie 1 for transporting a golf bag 2. The caddie 1 is supported by means of four wheels 4, 5 and comprises a battery 13 for supplying electrical energy for an electric motor that drives by means of a gear the two rear wheels 4. The two rear wheels 4 as well as the two front wheels 5 are secured on the chassis 3. A motor housing 35 is formed in the chassis 3 in which the motor is arranged. On the chassis 3 a handlebar 6 is secured that is arranged and fastened off-center between the two rear wheels on the rearward end of the chassis 3. The handlebar 6 has a lower section 11 that is connected to the chassis 3 and an upper section 10 on which a handle 7 is arranged.

The handle 7 extends on both sides of the handlebar 6. In this way, it is ensured that the carriage can be operated with the left hand or the right hand, i.e., by left-handed people or right-handed people, as well as with both hands in a simple and user-friendly way. In the area of the handle 7 on the upper section 10 of the handlebar 6 an operating unit 24 for controlling the drive motor is arranged. On the handle 7 there is also an umbrella holder 17 that is comprised of a pipe section fastened perpendicularly to the handle 7 by means of a clamping screw; an umbrella as a sunshade or rain protection can be secured in the holder.

In the chassis 3 there are two receptacles 9 provided which in the state of use of the caddie extend vertically above the chassis 3 and are cylindrical in shape. In the area of the front wheels 5, a rest 14 is formed on which the golf bag 2 can rest with its lower end 33. In the area of the handlebar 6, the golf bag 2 rests with its upper end 34 against a support 16. The rest 14 supports the golf bag 2 in its longitudinal direction as well as in the radial direction while the support 16 secures the golf bag 2 primarily in the radial direction.

Figure 2:
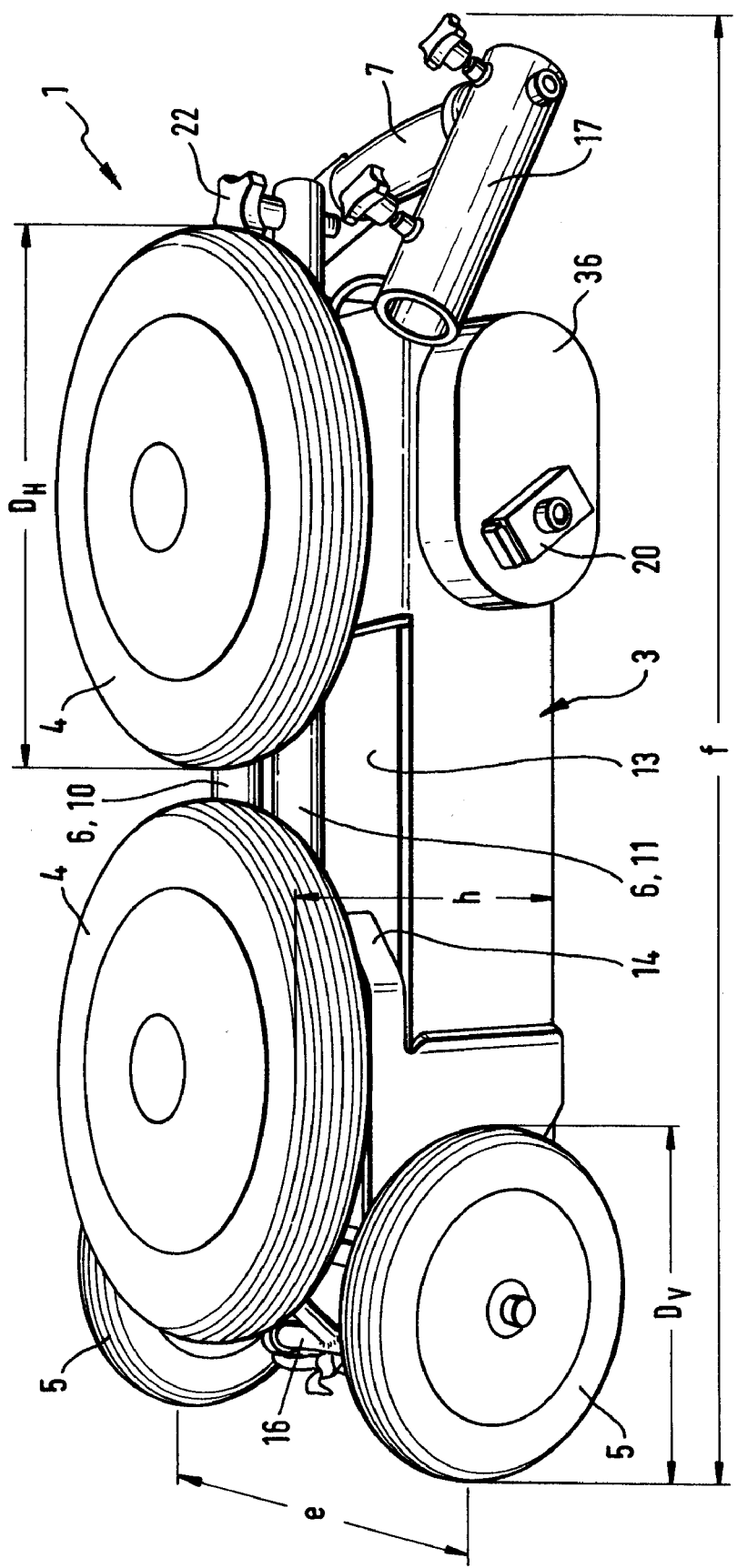
FIG. 2 is a perspective view of the caddie of FIG. 1 in the transport state.

In FIG. 2, the caddie 1 is illustrated in the transport state. The height h of the caddie 1 is essentially determined by the height of the chassis 3, the diameter of the handlebar 6, and the width of rear wheels 4. The diameter $D_V$ of the front wheels 5 corresponds maximally to the height h. The rear wheels 4 are positioned in the transport state on the chassis 3. The width e of the caddie 1, i.e., its extension parallel to the axles of the wheels 4, 5 in the operating state, is determined essentially by the width B of the chassis 3 illustrated in FIG. 4 and the width of the front wheels 5. The length f of the caddie 3 corresponds approximately to the length L of the chassis 3 illustrated in FIG. 4 in the state of use. The diameter $D_H$ of the rear wheels 4 corresponds approximately to the width e and approximately to half the length f wherein the diameter $D_H$ is advantageously matched to the width B of the chassis 3 and half the length L of the chassis 3. The caddie 1 forms thus a compact package in the transport state.

Figure 3:
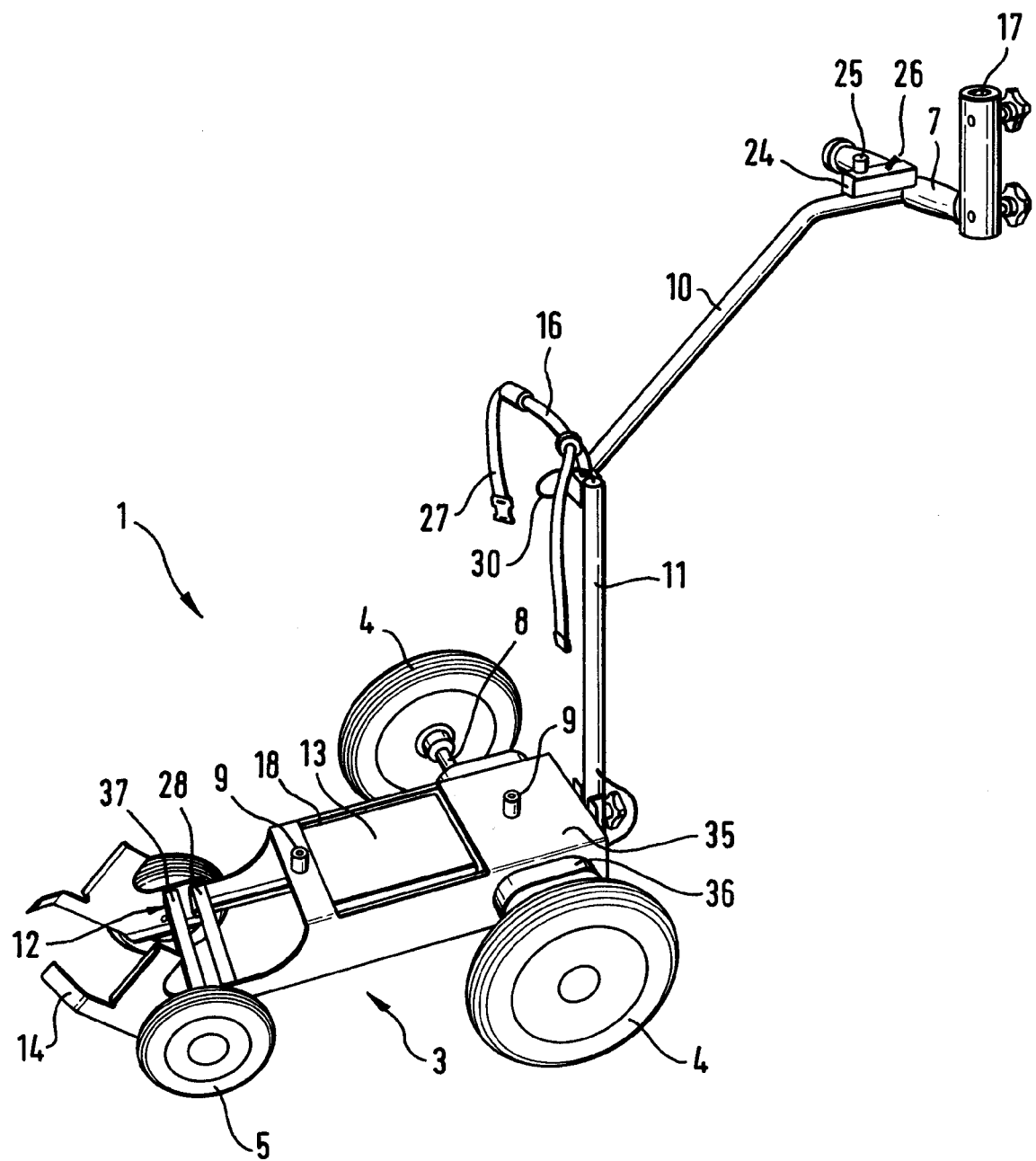
FIG. 3 is a perspective view of the caddie of FIG. 1 in the state of use.

In FIG. 3, the caddie 1 is illustrated in the state of use without the golf bag 2. The battery 13 is arranged in the battery receptacle 18 in the chassis 3. Viewed in the travel direction, in front of and behind the battery receptacle 18 a cylindrical receptacle 9 is arranged, respectively, approximately centrally on the chassis 3; they are provided, as will be explained in the following in more detail, for securing the rear wheels 4 during transport. In the area of the front wheels 5 the chassis has a transverse stay 28 that is formed, for example, as a pipe having a rectangular cross-section and is laterally welded to the chassis. The front wheels 5 are arranged on both sides of a frame element 12 wherein the frame element 12 comprises a transverse stay 37 and two lateral sheet metal sections that form the rest 14. The lateral sheet metal sections extend substantially parallel to the longitudinal extension of the chassis 3. The transverse stay 37 of the frame element 12 is arranged parallel to the transverse stay 28 of the chassis 3 and is displaced relative thereto in the travel direction forwardly.

The motor housing 35 is formed within the chassis 3 and is displaced relative to the battery receptacle 18 in a direction counter to the travel direction. The rear wheels 4 have halfshafts 8 by which the wheelbase of the rear wheels is enlarged. By means of the halfshaft 8, the rear wheels 4 can be easily mounted and demounted. Moreover, the halfshafts 8 are designed to be inserted into the cylindrical receptacles 9 in the transport state so that the rear wheels are held as shown in the illustration of FIG. 2. The support 16 has a strap 27 for the fixation of a golf bag 2. The support 16 is approximately of a T-shaped configuration and is comprised of two pipe sections wherein the belt 27 is advantageously guided through the pipe that forms the support for the golf bag 2. The operating unit 24 provided on the upper section 10 of the handlebar 6 comprises expediently a speed adjusting button 25 and an on/off switch 26.

Figure 4:
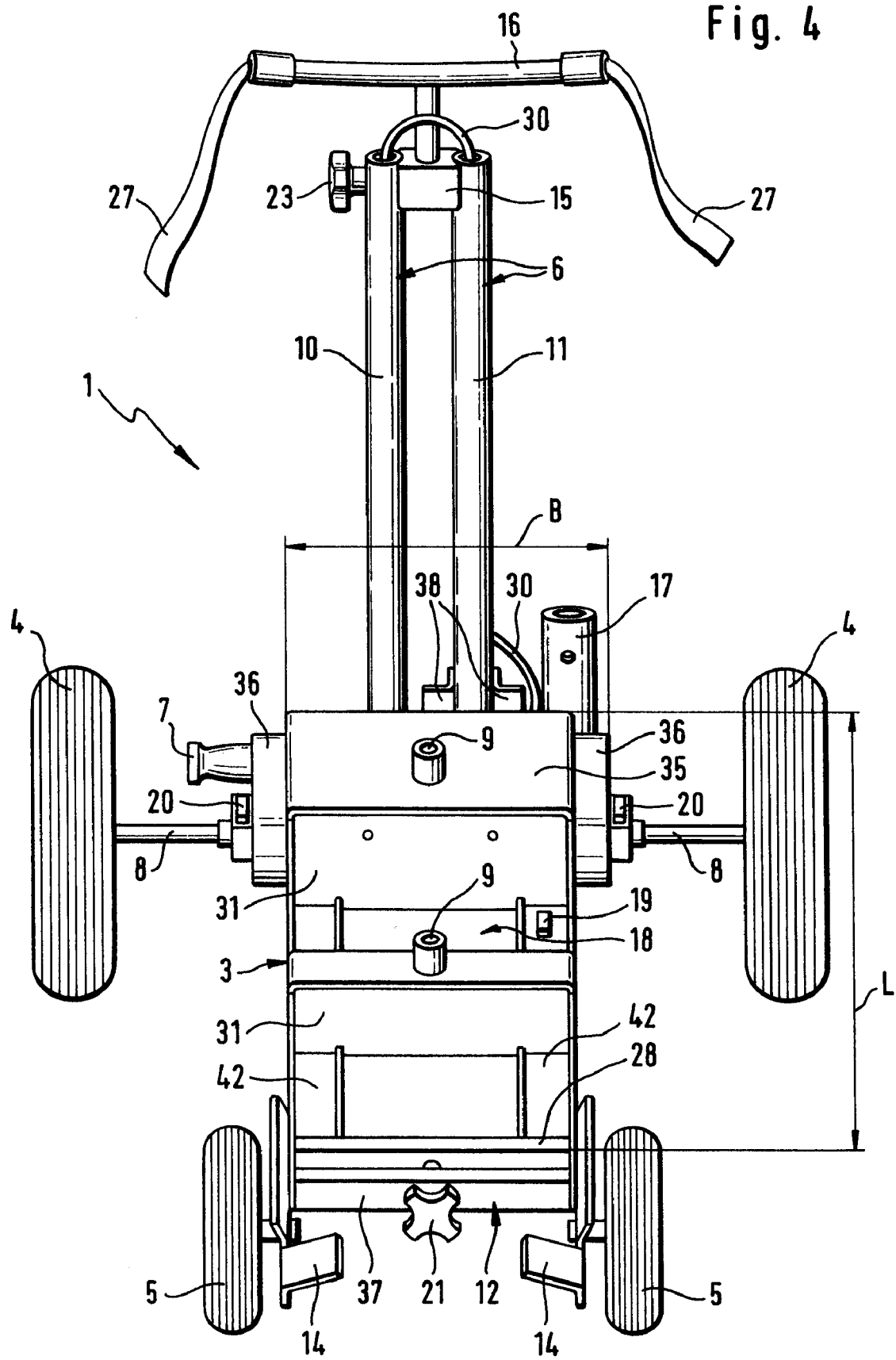
FIG. 4 is a perspective view of the caddie of FIG. 1 with partially collapsed handlebar.
Figure 5:
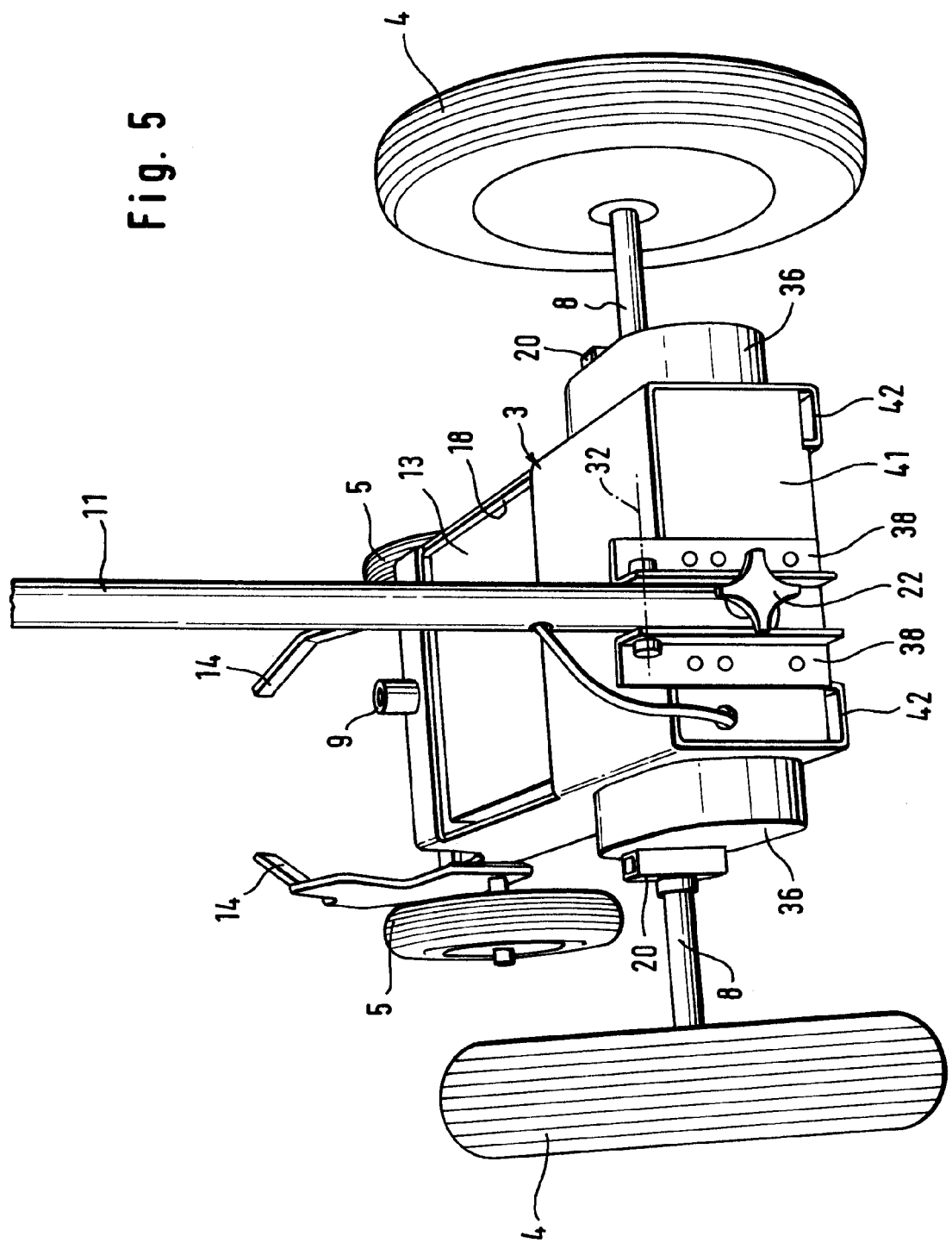
FIG. 5 is a perspective partial view of the caddie of FIG. 1.

In FIG. 4, the caddie 1 is illustrated in a view from the front onto the chassis 3, wherein the upper section 10 of the handlebar 6 is folded. The upper section 10 of the handlebar 6 is supported on the lower section 11 by means of an intermediate member 15. For fixation, the screw 23 is provided. For electrically connecting the motor arranged within the motor housing 35 to the operating unit 24, a cable 30 is guided through the handlebar 6. On both sides of the motor housing 35 there are gearbox housings 36 provided on which the halfshafts 8 of the rear wheels 4 are secured by means of slide locks 20. The slide locks 20 secure the halfshaft 8 by positive engagement. However, it can also be expedient to provide a non-positive fixation of the halfshafts 8. The chassis 3 has a width B parallel to the wheel axles and a length L perpendicularly thereto wherein the width B also includes the width of the gearbox housing 36.

Figure 10:
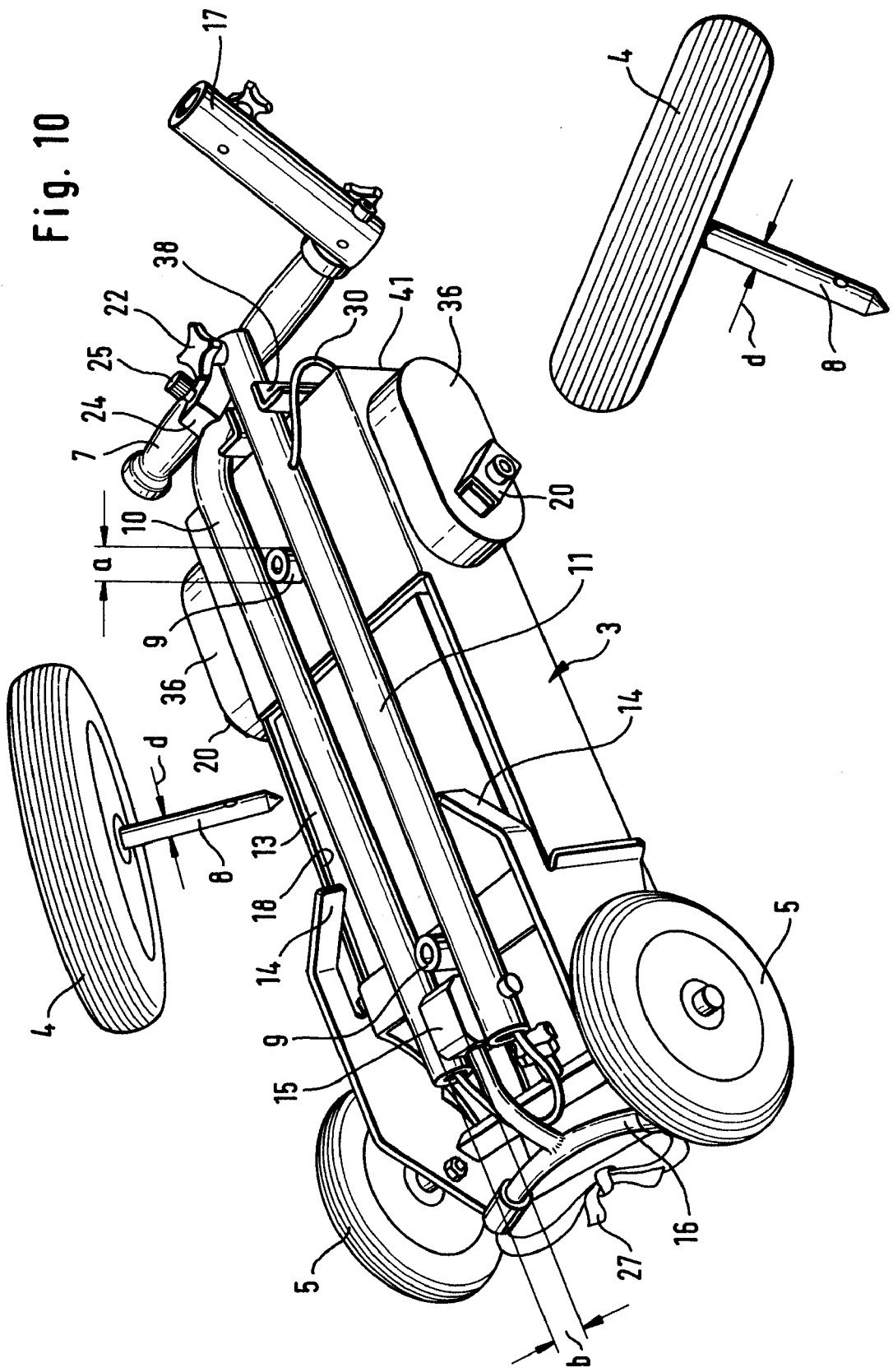
FIG. 10 is a perspective view of the caddie of FIG. 1 in the transport state, however with separate rear wheels.

The rear wheels 4 are provided with freewheeling action so that the caddie 1 can be easily moved in the travel direction without motor drive action. By reversing the rear wheels 4, the freewheeling action also operates in the opposite direction, i.e., the caddie 1 can also be pulled in a simple way. The halfshafts 8, as illustrated in particular in FIG. 10, are displaced forwardly relative to the real wall 41 of the chassis 3 in the travel direction. This provides a beneficial weight distribution because the motor in the motor housing 35 is arranged on one side of the halfshafts 8, in particular, in the travel direction behind the halfshafts, and the battery 13 is arranged in the battery receptacle 18 on the opposed side of the halfshafts 8. The carriage can be pivoted easily about the axis that is formed by the halfshafts 8 so that the front wheels 5 are lifted off the bottom. In this position, the carriage can be pulled easily. In particular, when disruptions of the drive or of the energy supply occur, the carriage can be simply pulled with minimal force expenditure when reversing the halfshafts 8. By switching the rotational direction of the motor, a drive action of the caddie counter to the normal travel direction is possible. The front wheels 5 of the caddie have also a freewheeling action so that they block in a direction counter to the travel direction. In this way, accidental run-away of the caddie can be prevented.

The chassis 3 is formed of a bent sheet metal part wherein the sheet metal part is substantially bent to a U-shape. Particularly aluminum alloys are suitable as a material for the chassis 3. In particular, for the manufacture of the chassis in large production numbers it is provided that the chassis 3 is injection-molded completely of plastic material. The ends of the legs of the U are bent to a U-shape toward the middle of the U, respectively, and form in this way longitudinal stays 42 of great stiffness while having minimal material thickness. In the area of the battery receptacle 18 the chassis is stamped out on the top side. The bent ends of the U form the supports for the battery. The stamped-out sections are inserted into the U-shaped chassis 3 transversely to its longitudinal direction and form in this way the sidewalls 31 of the battery receptacle 18. The frame element 12 where the front wheels 5 are arranged is secured without play by clamping it with a screw 21 on the chassis 3. The screw 21 is supported in a threaded sleeve that penetrates the transverse stay 37 of the frame element 21 and is screwed against a stop element provided on the transverse stay 28 of the chassis 3.

Figure 6:
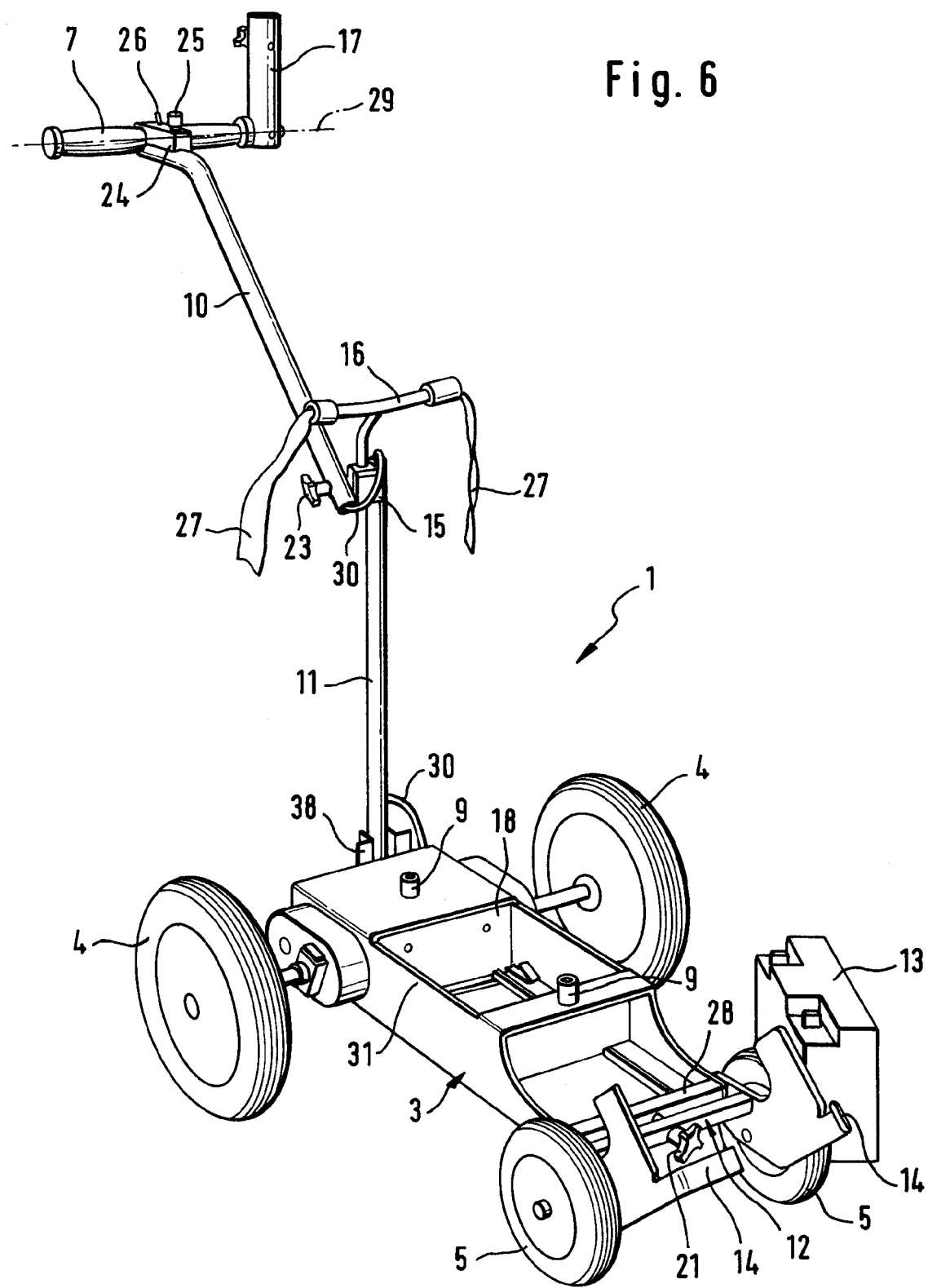
FIG. 6 is a perspective view onto the caddie of FIG. 1 with the battery removed.

FIG. 6 shows the caddie 1 with removed battery 13. The battery receptacle 18 is approximately frame-shaped. In this way, a simple removal and insertion of the battery 13 ensured. The battery receptacle 18 can be closed by a lid. It can be expedient to close the battery receptacle 18 in the upward direction and to design it such that the battery can be inserted from below, i.e., from a side facing away from the golf bag 2. The battery 13 is thus not visible to the operator during operation of the caddie 1. Other constructive configurations with which the battery 13 is not visible within the chassis 3 may be advantageous also. On the handle 7 an umbrella holder 17 is arranged. It is rotatable about the longitudinal axis 29 of the handle 7 wherein the umbrella holder 17 can be secured in preset positions, in particular, in positions that are rotated by 90° relative to one another, on the handle 7. The fixation is realized, for example, by a screw that is screwed into a threaded section arranged within the handle 7 or into a recess.

Figure 7:
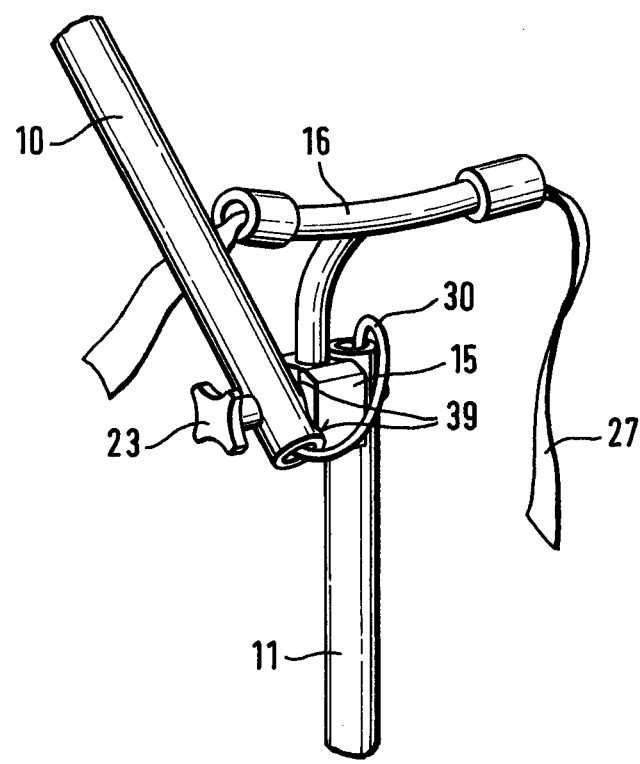
FIG. 7 is perspective view of the intermediate piece of the handlebar of the caddie of FIG. 1.
Figure 8:
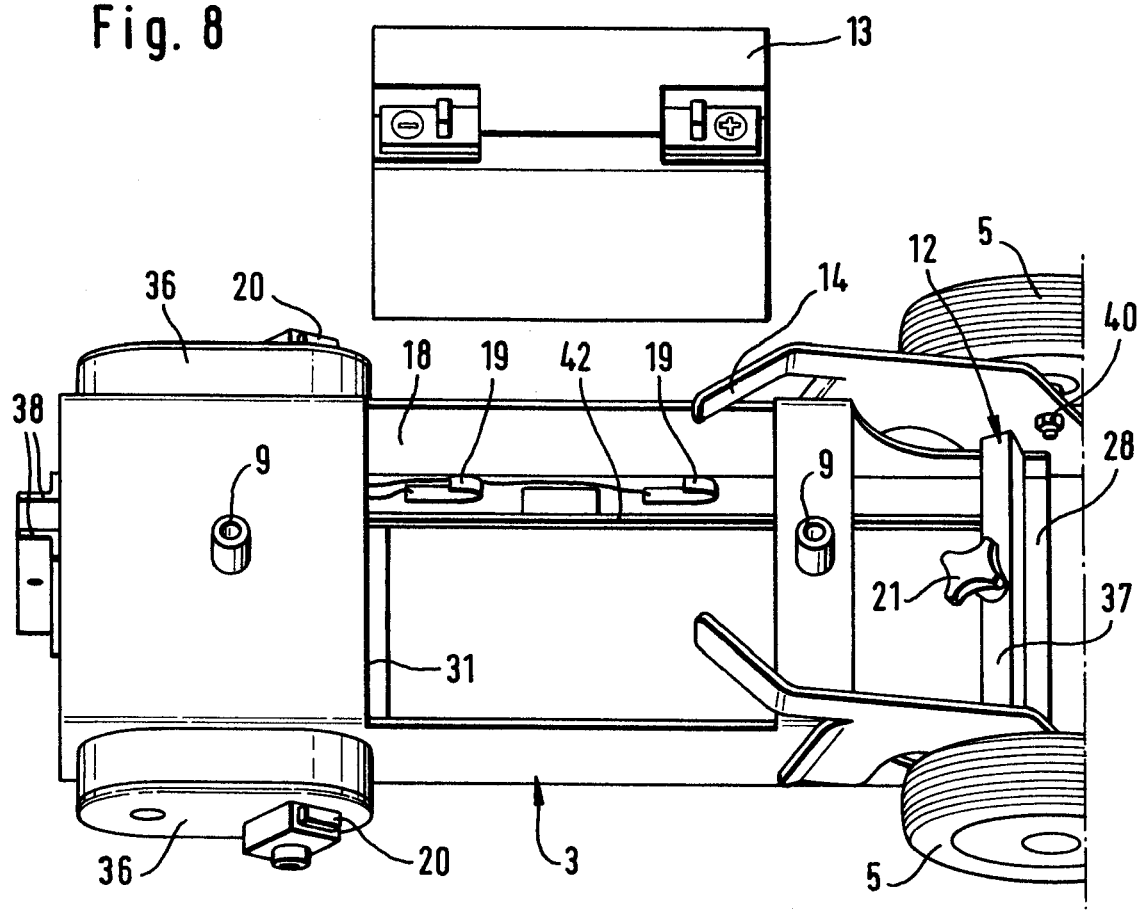
FIG. 8 is a perspective view of the battery receptacle of the caddie of FIG. 1.

In FIG. 7, the intermediate member 15 between the upper section 10 and the lower section 11 of the handlebar 6 is illustrated on an enlarged scale. The intermediate member 15 is welded to the lower section 11. On the intermediate member 15 the support 16 is secured. On the side of the intermediate member 15 facing the upper section 10, grooves 39 are provided whose radius corresponds to the pipe radius of the upper section 10. In this way, different positions of the upper section 10 and the lower section 11 relative to one another are determined. The upper section 10 is secured by means of a screw 23 on the intermediate member 15. The secured positions relative to one another are advantageously a linear position and an angled position of approximately 45° of the sections 10, 11.

In FIG. 7, the intermediate member 15 between the upper section 10 and the lower section 11 of the handlebar 6 is illustrated on an enlarged scale. The intermediate member 15 is welded to the lower section 11. On the intermediate member 15 the support 16 is secured. On the side of the intermediate member 15 facing the upper section 10, grooves 39 are provided whose radius corresponds to the pipe radius of the upper section 10. In this way, different positions of the upper section 10 and the lower section 11 relative to one another are determined. The upper section 15 is secured by means of a screw 23 on the intermediate member 15. The secured positions relative to one another are advantageously a linear position and an angled position of approximately 45E of the sections 10, 11.

Figure 9:
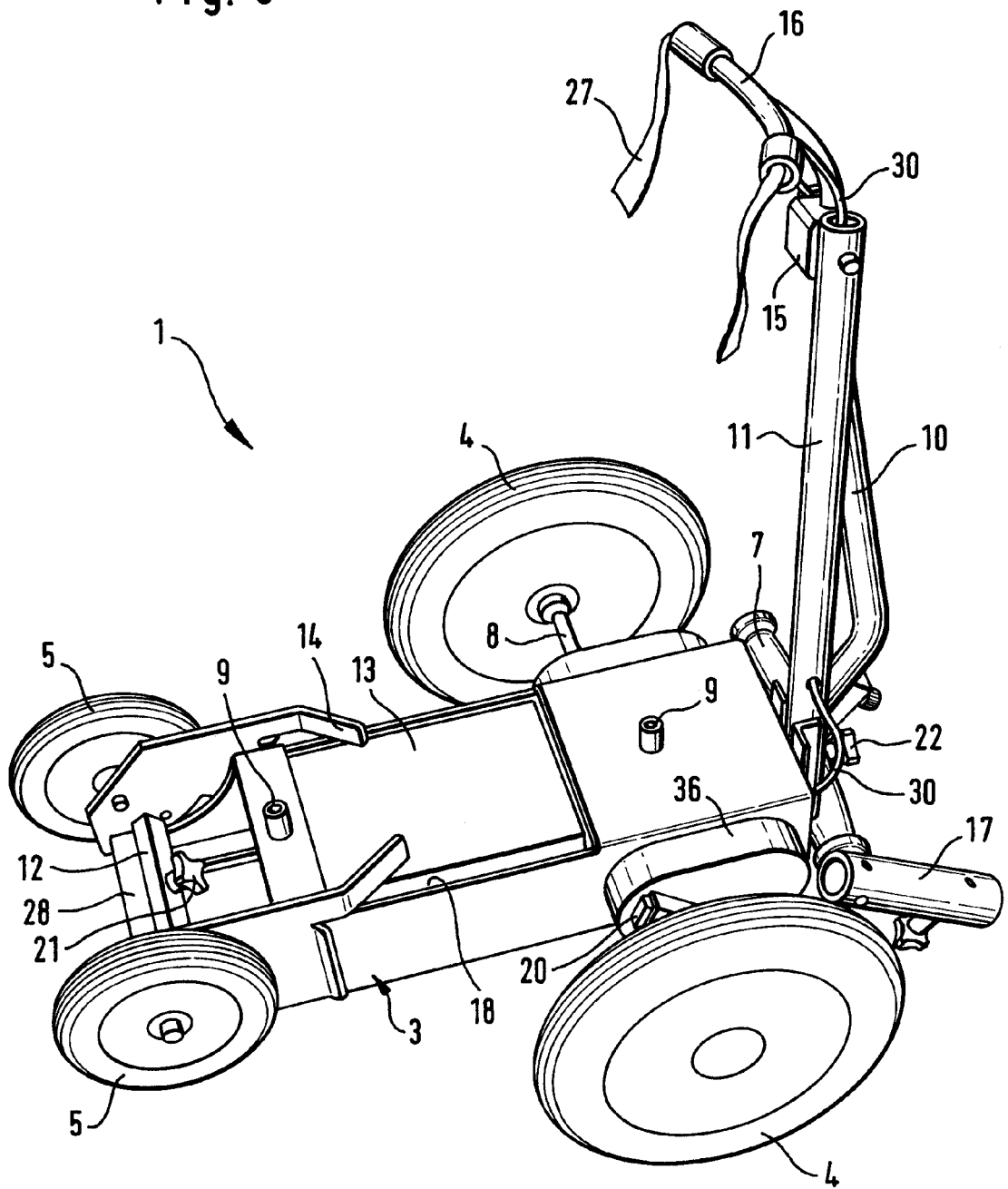
FIG. 9 is a perspective view of the caddie of FIG. 1 with partially collapsed handlebar and frame element folded toward the chassis.

FIG. 9 shows the caddie 1 in a partially collapsed state. The frame element 12 has been folded toward the chassis 3 about a pivot axis that extends transversely to the chassis 3. The battery 13 is arranged in the battery receptacle 18 and is secured in the upward direction by the rest 14 of the frame elements 12. The upper section 10 of the handlebar 6 is folded down. The umbrella holder 17 is in a position rotated by 90° about the longitudinal axis 29 of the handle 7.

FIG. 9 shows the caddie 1 in a partially collapsed state. The frame element 12 has been folded toward the chassis 3 about a pivot axis that extends transversely to the chassis 3. The battery 13 is arranged in the battery receptacle 18 and is secured in the upward direction by the rest 14 of the frame elements 12. The upper section 10 of the handlebar 6 is folded down. The umbrella holder 17 is in a position rotated by 90E about the longitudinal axis 29 of the handle 7.

FIG. 10 shows the caddie 1 in a substantially collapsed state. The handlebar 6 has been folded onto the chassis 3. The width b of the intermediate member 15 between the upper section 10 and the lower section 11 of the handlebar 6 corresponds approximately to the outer diameter a of the receptacle 9. The holder 38 of the handlebar 6 is displaced outwardly relative to the central arrangement on the chassis 3 so that the lower section 11 and the upper section 10 of the handlebar 6 rest on opposed sides of the receptacles 9 on the chassis 3. The handle 7 is arranged in a direction opposite to the travel direction adjacent to the chassis 3. The support 16 is positioned between the two front wheels 5 on the chassis 3. The halfshafts 8 of the rear wheels 4 can be inserted into the receptacles 9 in order to position the caddie 1 in the transport position illustrated in FIG. 2. In the receptacles 9, the halfshafts 8 can be secured by non-positive engagement or positive engagement.

The receptacles 9 can be formed also simply as openings. In this case, the width b of the intermediate member 15 between the sections 10, 11 of the handlebar 6 should be matching at least the diameter d of the halfshaft 8 of the rear wheels 4. For driving the rear wheels 4 gearboxes are provided that are arranged in the gearbox housings 36 on opposed sides of the chassis 3. In particular planetary gears are provided as a drive means. The planetary gears have relative to conventional worm gear pairs a significantly greater efficiency so that the batteries 13 required for the drive action can be smaller and lighter. It can also be expedient to arrange the gearboxes in the motor housing 35. By arranging the battery 13 in the chassis 3, the caddie 1 has a low center of gravity.

Instead of the screw fixation of the frame element 12 and the handlebar 6, positive engagement fixation means such as, for example, locks can be expedient. The use of screws ensures a high stability of the caddie 1 and enables a play-free fixation of the parts. For a simple actuation of the screws 21, 22, 23, they are provided with gripping elements which are, for example, made of plastic material. A further embodiment of the caddie 1 is illustrated in FIGS. 11 to 21. In this connection, components that correspond to those of the caddie illustrated in FIGS. 1 through 10 are identified with identical reference characters. The caddie 1 illustrated in a plan view in FIG. 11 and a side view in FIG. 12 has a chassis 3 in which a receptacle 18 for a battery 13 is formed. The receptacle 18, viewed in the travel direction, is arranged in front of the axle of the rear wheels 4. The battery receptacle 18 is arranged between the two longitudinal stays 42 formed by the chassis 3. The battery 13 is connected with the motor arranged in the motor housing 35 by means of two cables 56 that are inserted with plugs 55 into the plug contact 54. As illustrated also in FIG. 12, the plug contact 54 is arranged in the travel direction 85 directly behind the receptacle 9 on the side of the receptacle 9 opposite the battery 13. The two plugs 55 are inserted closely adjacent to one another into the plug contact 54 so that the lines 56 are arranged in the area of the receptacle 9 and the plugs 55 project directly adjacent to the receptacle 9 out of the chassis 3. When the plugs 55 are inserted into the plug contact 54, the halfshaft 8 of a rear wheel 4 cannot be inserted into the receptacle 9. In this way, it is ensured that in the transport state the batteries and the motor are always electrically separated from one another. In this way, it is prevented that the motor is accidentally switched on in the transport state.

Figure 11:
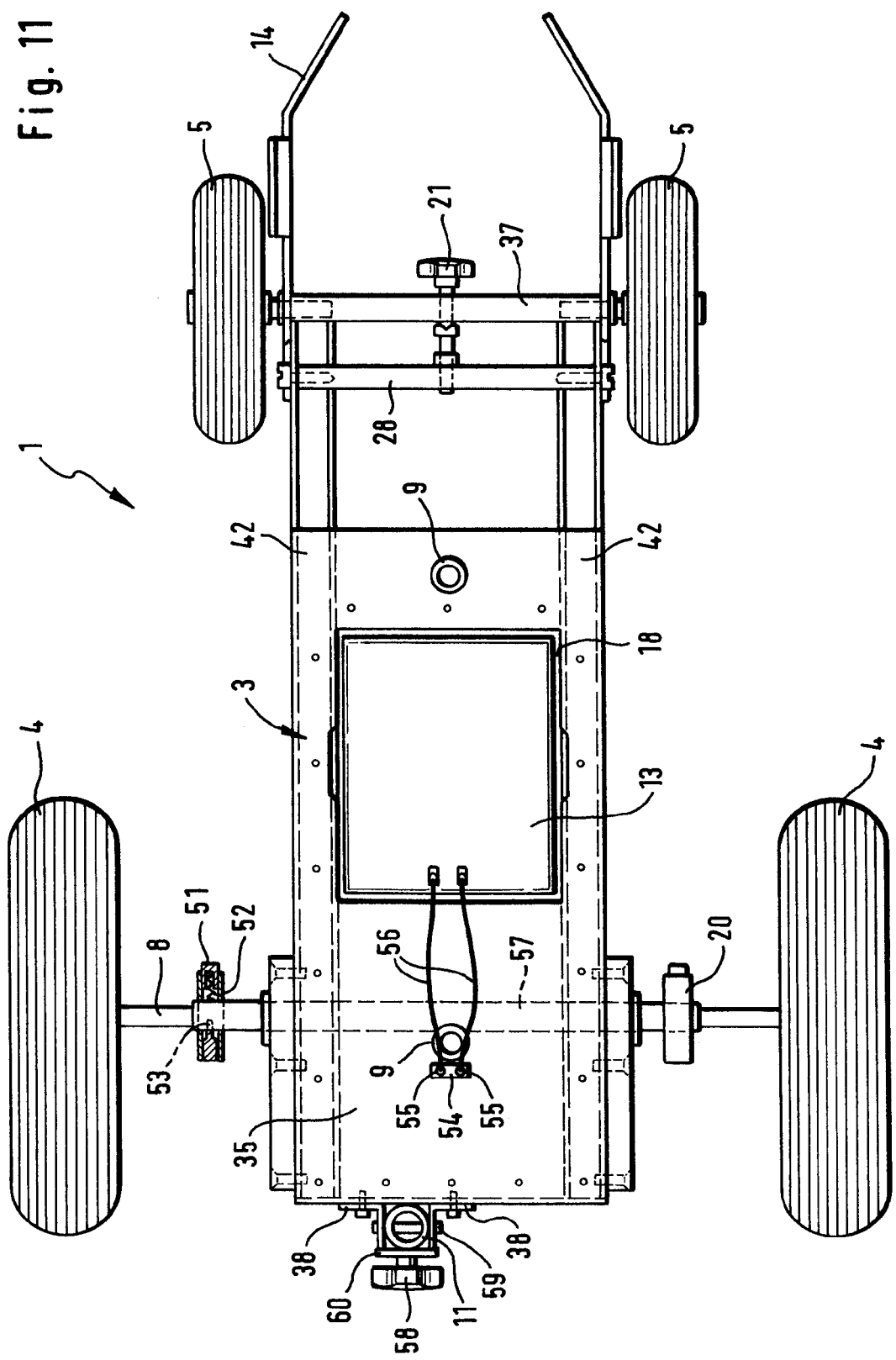
FIG. 11 shows a plan view onto a caddie of a second embodiment.
Figure 12:
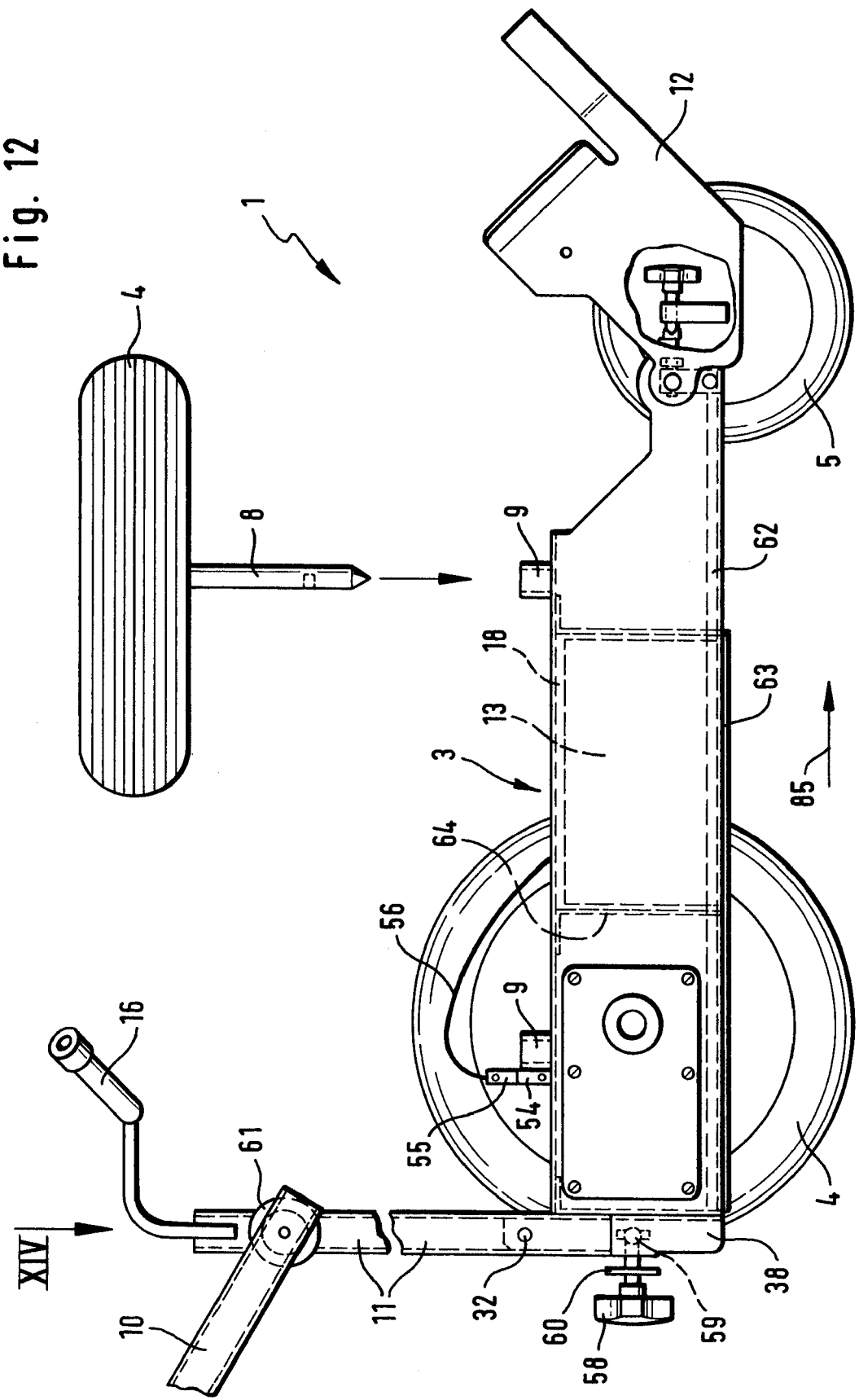
FIG. 12 is a side view of the caddie of FIG. 11.

In FIG. 11, a slide lock 20 is illustrated in section. The slide lock 20 has a button 51 that is tensioned by a spring 52 and is connected to a bolt 53. When pushing the button 51 counter to the force of the spring 52, the bolt 53 is pushed out of a bore in the halfshaft 8 so that the halfshaft 8 is released. The two halfshafts 8 are secured by means of the slide locks 20 in the continuous hollow shaft 57.

The lower section 11 of the handlebar 6 is supported rotatably with both ends in holders 38 about an axis of rotation 32. The two holders 38 are formed as L-shaped angle members. The lower section 11 of the handlebar 6 is detachably secured by means of a screw 58 on the chassis 3. In FIG. 11, the screw 58 is illustrated in the secured state while it is shown in the released state in FIG. 12. The screw 58 is fixedly secured to bolts 59 that extend on opposed sides of the screw 58 and are rotatably supported in the holders 38. On the screw 58 a plate 60 is fastened that, in the secured state, pushes against the lower section 11 of the handlebar 6 and in this way secures it in its position. The lower section 11 of the handlebar 6 is slotted in the area of the screw 58. The screw 58 projects through the slot in the lower section 11. By releasing the screw 58, it can be pivoted about the bolt 59 so that the lower section 11 is no longer secured. The lower section 11 can be pivoted about the axle 32 and can be folded onto the chassis 3. In this way, a simple and fast detachment and fixation of the handlebar 6 is ensured. The chassis 3 is formed of a frame 62 and a bottom element 63. Between the bottom element 63 and the frame 62, a securing plate 64 is fastened in the area of the battery receptacle 18, and an electronic control unit is fastened thereon.

Figure 17:
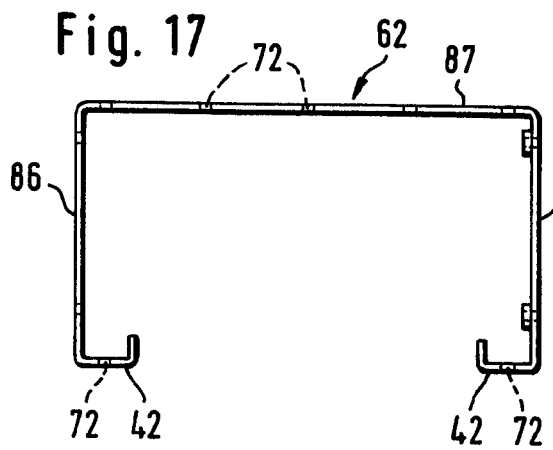
FIG. 17 shows a side view of the frame of the caddie of FIG. 11.
Figure 18:
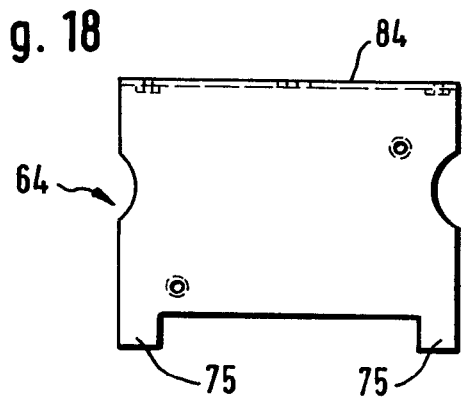
FIG. 18 is a side view of a securing plate of the caddie of FIG. 11.
Figure 19:
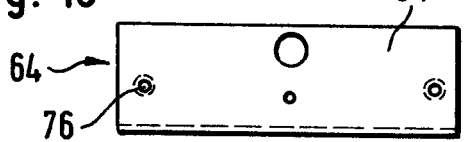
FIG. 19 shows a plan view onto the securing plate of FIG. 18.

In FIG. 17, the frame 62 is illustrated in a side view. The frame 62 has a U-shape wherein the legs of the U are bent twice inwardly by 90° so that longitudinal stays 42 result. The frame 62 forms the top side 87 of the chassis 3 as well as the sidewalls 86 extending in the travel direction 85. In the area of the longitudinal stays 42, the frame 62 is provided with rivet openings 72 that are connected by rivets to the rivet openings 73 provided on the longitudinal side 83 of the bottom element 63. On the side opposite the longitudinal stays 42 there are also rivet openings 72 to be connected to the rivet openings 73 arranged on the edges 82 of the bottom element. In FIGS. 18 and 19, the securing plate 64 is illustrated. The securing plate 64 has two tabs 75 that are inserted into slots 74. The narrow slide 84 of the securing plate 64 illustrated in FIG. 19 in a plan view projects in the direction of the back wall 71 of the bottom element 63. The securing plate 64 has on its narrow slide 84 rivet openings 76 for connecting it to the frame 62.

In FIG. 17, the frame 62 is illustrated in a side view. The frame 62 has a U-shape wherein the legs of the U are bent twice inwardly by 90E so that longitudinal stays 42 result. The frame 62 forms the top side 87 of the chassis 3 as well as the sidewalls 86 extending in the travel direction 85. In the area of the longitudinal stays 42, the frame 62 is provided with rivet openings 72 that are connected by rivets to the rivet openings 73 provided on the longitudinal side 83 of the bottom element 63. On the side opposite the longitudinal stays 42 there are also rivet openings 72 to be connected to the rivet openings 73 arranged on the edges 82 of the bottom element. In FIGS. 18 and 19, the securing plate 64 is illustrated. The securing plate 64 has two tabs 75 that are inserted into slots 74. The narrow slide 84 of the securing plate 64 illustrated in FIG. 19 in a plan view projects in the direction of the back wall 71 of the bottom element 63. The securing plate 64 has on its narrow slide 84 rivet openings 76 for connecting it to the frame 62.

Figure 13:
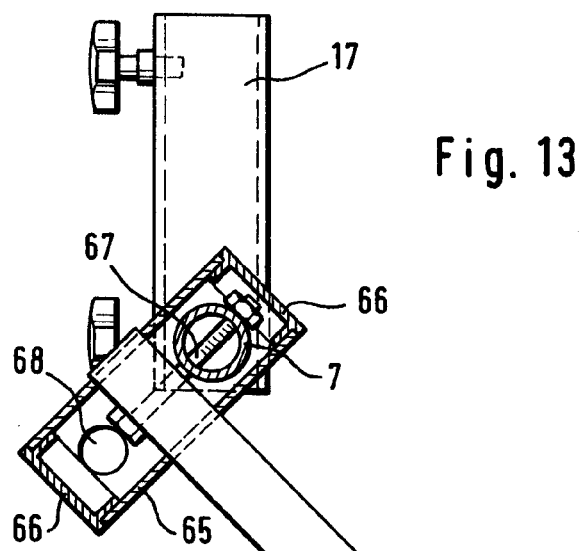
FIG. 13 is a side view of the handlebar of the caddie of FIG. 11 in the direction of arrow XIII of FIG. 14.

In FIG. 13, the fixation of the handle 7 on the upper section 10 of the handlebar 6 is illustrated. On the upper section 10 a connecting pipe 65 is arranged that is provided approximately centrally with a transverse bore through which the upper section 10 is guided. On the side of the connecting pipe 65 pointing upwardly, an additional transverse bore is provided that extends perpendicularly to the first transverse bore and through which the handle 7 projects. The handle 7 is fixedly connected with the upper section 10 of the handlebar 6 by means of the screw 67 in the connecting pipe 65. On the side of the upper section 10 opposite the handle 7, the connecting pipe 65 has an additional transverse bore that forms a receptacle 68, for example, for operating elements. The connecting pipe 65 is provided at both ends with end caps 66. On the handle 7, an umbrella holder 17 is secured.

Figure 14:
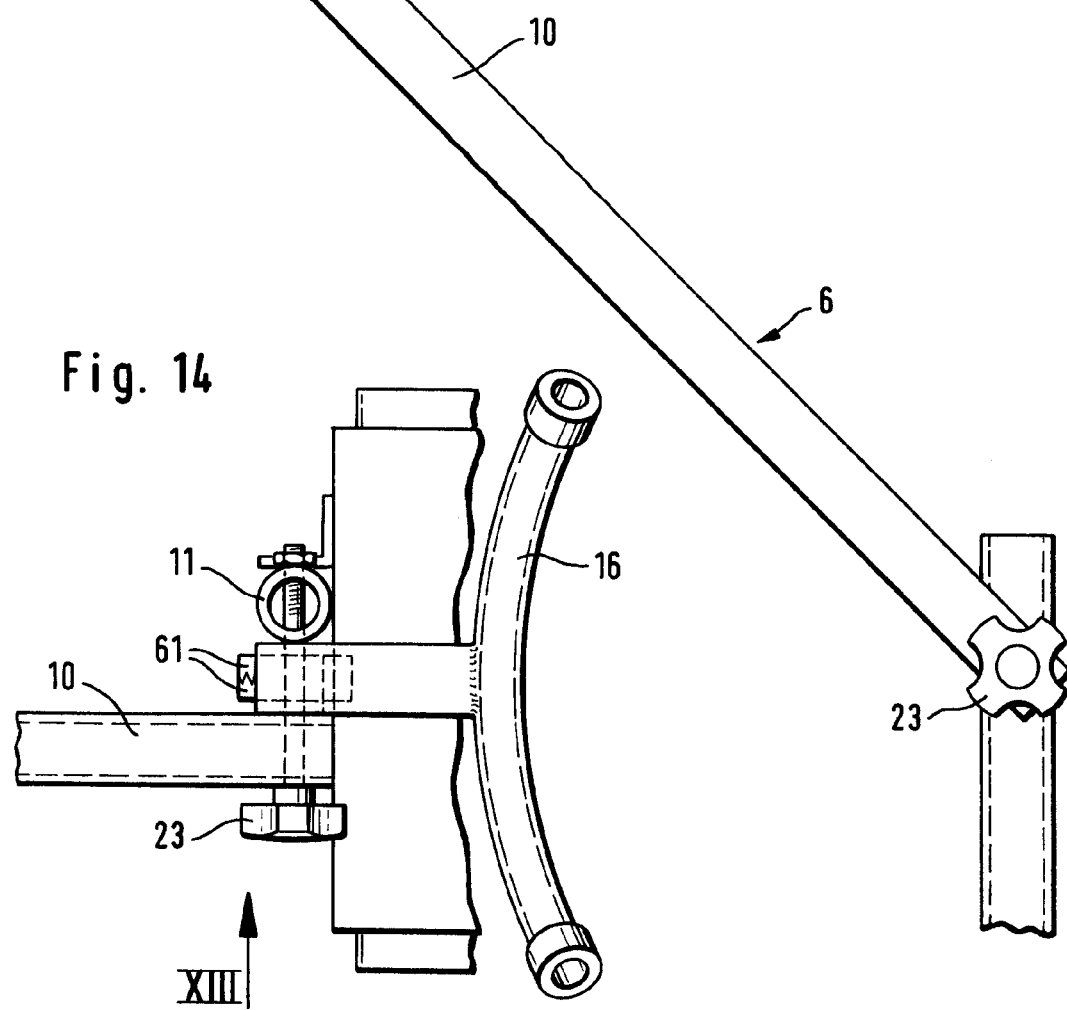
FIG. 14 shows a plan view onto the handlebar of the caddie in the direction of arrow XIV of FIG. 12.
Figure 15:
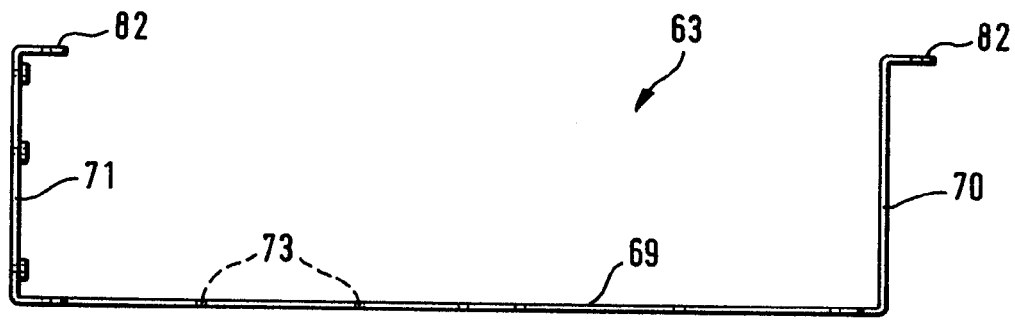
FIG. 15 is a side view of a bottom element of the caddie of FIG. 11.
Figure 16:
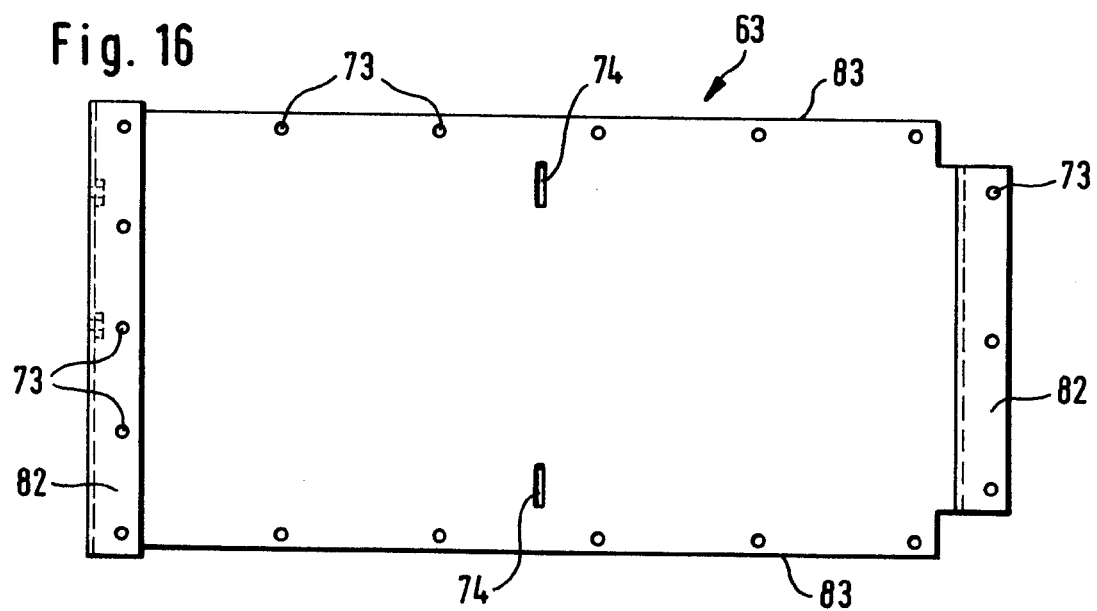
FIG. 16 shows a plan view onto the bottom element of FIG. 15.

FIG. 14 shows the connection of the lower section 11 to the upper section 10. The intermediate member arranged between the two sections is formed by two crown gears 61 that are fixedly connected with a section of the handlebar 6, respectively. A screw 23 penetrates both sections of the handlebar 6 transversely to its longitudinal extension as well as the two interposed crown gears 61 in their center axis. By loosening the screw 23, the two crown gears 61 can be rotated relative to one another. The toothing determines the possible angles between the two sections of the handlebar 6. At the lower section 11, the support 16 for a golf bag 2 is fastened, in particular, by welding.

Figure 20:
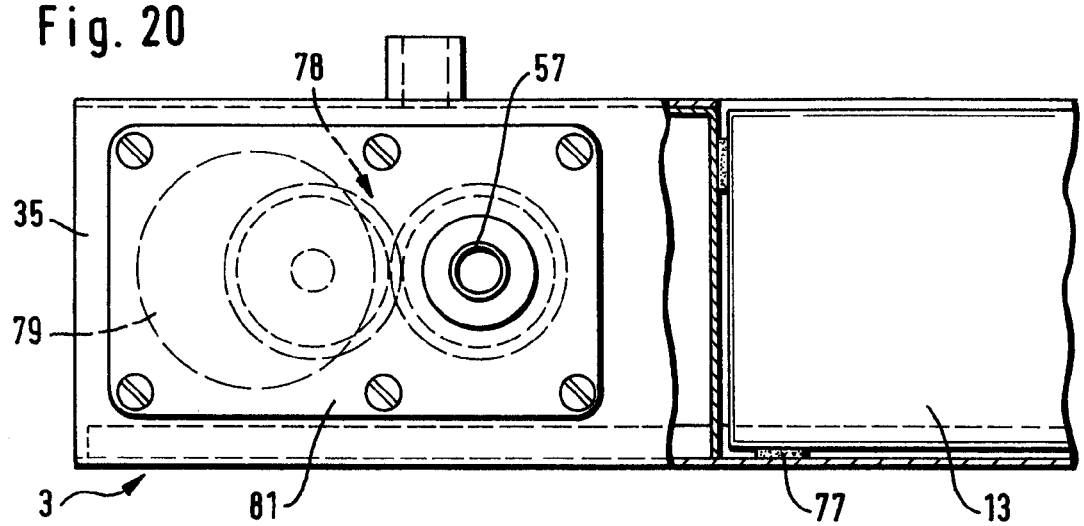
FIG. 20 is a side view of the chassis in the area of the motor housing.
Figure 21:
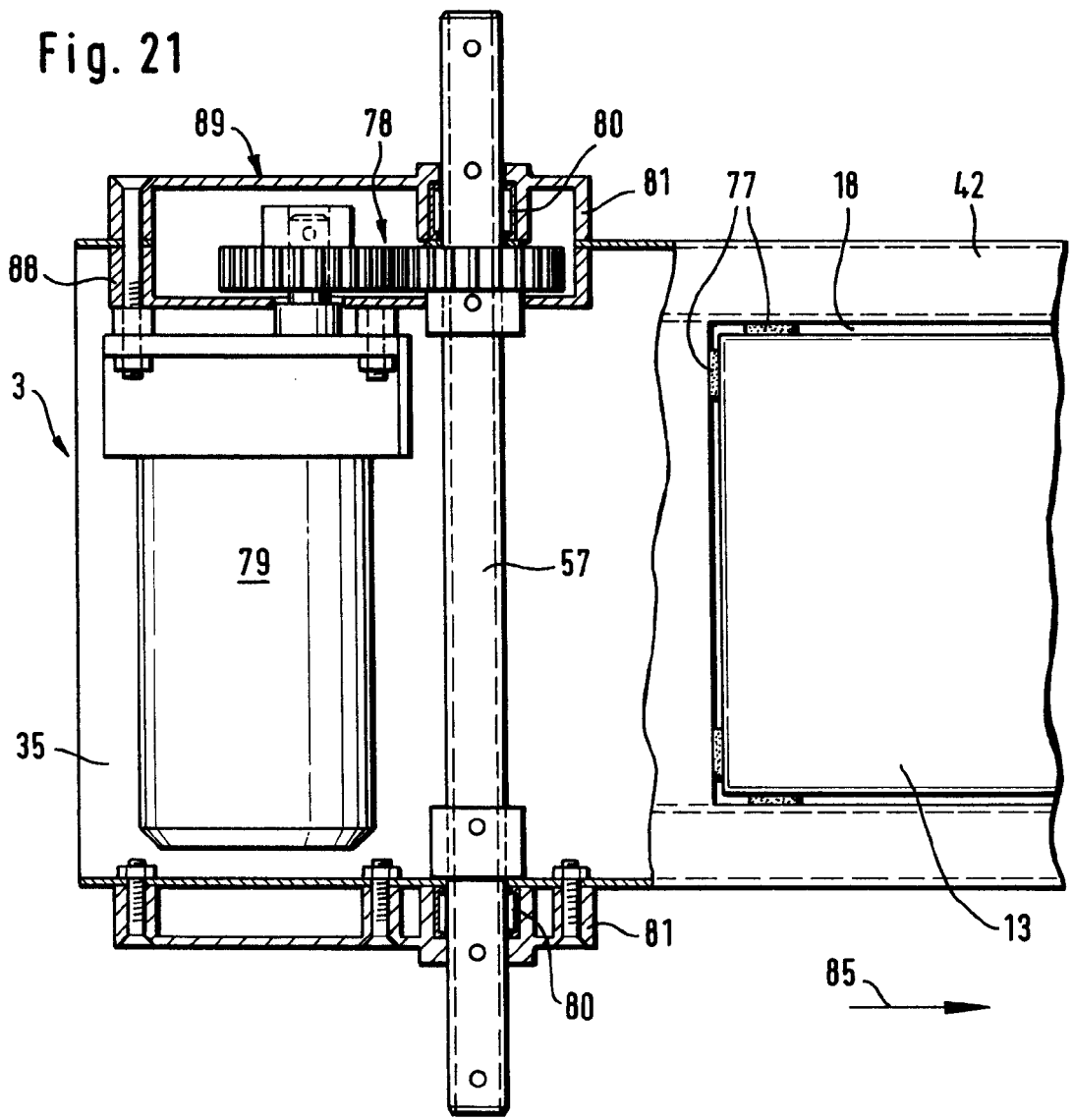
FIG. 21 shows a longitudinal section of the chassis in the area of the motor housing.

FIGS. 20 and 21 show the chassis 3 in the area of the motor housing 35. In the motor housing 35, the motor 79 is arranged that is formed expediently as a 24 volt motor. The motor 79 drives by means of a spur wheel gear 78 the hollow shaft 57. The hollow shaft 57 is supported with both ends on the chassis 3 in covers 81. The covers 81 are expediently made of plastic material and serve as a receptacle for the bearings 80 of the hollow shaft 57. In one of the covers 81 the gear 78 is arranged. The covers 81 forms together with a lid 88 that is arranged in the interior of the chassis 3 a substantially closed gearbox housing 89. On the gearbox housing 89 the motor 79 is flange-mounted. The gearbox housing 89 protects the gear 78 against soiling.

The battery 13 is arranged in the receptacle 18. Expediently, the battery 13 is in the form of two serially connected batteries. In this way, the output can be increased. The battery 13 is supported on felt 77 in the receptacle 18. The electronic device for controlling the motor is mounted on the intermediate plate 64 illustrated in FIG. 12 that forms the sidewall of the battery receptacle 18 that is arranged in the travel direction to the rear. The battery receptacle 18 is arranged in the travel direction 85 in front of the hollow shaft 57 while the motor 79 in the travel direction 85 is positioned behind the hollow shaft 57. In this way, the weight distribution about the hollow shaft 57 is substantially balanced so that the caddie 1 can be rotated by pressing on the handlebar 6 about the hollow shaft 57 and, in this way, the front wheels 5 can be lifted off the bottom. In this position, the caddie 1 can be pulled easily.

The sheet metal parts forming the chassis 3 are expediently coated with a film during manufacture. In this way, damage to the sheet metal parts, for example, scratching of the surface, can be prevented. After mounting, the film is removed from the sheet metal parts.

While specific embodiments of the invention have been shown and described in detail to illustrate the inventive principles, it will be understood that the invention may be embodied otherwise without departing from such principles.

What is claimed is:

1. A carriage for transporting a container, the carriage comprising:
   a chassis comprising a motor housing and a battery receptacle arranged inside the chassis;
   at least three wheels connected to the chassis for supporting the chassis, wherein the at least three wheels include two rear wheels;
   a handlebar connected to the chassis for guiding the carriage in a state of use, wherein the carriage is convertible from the state of use into a transport state, wherein the chassis in the state of use is arranged such that a longitudinal extension of the chassis is parallel to a ground surface on which the carriage is moved;
   a handle connected to the handle bar;
   a motor arranged in the motor housing for driving the two rear wheels;
   a battery arranged in the battery receptacle for supplying electric energy to the motor for operating the motor;
   wherein the rear wheels are provided with halfshafts that are fastened detachably on the chassis;
   wherein the chassis has means for securing the rear wheels on the chassis in the transport state.

2. The carriage according to claim 1, wherein the rear wheels in the transport state are supported on the chassis in a position in which the rear wheels lie flat on the chassis, wherein the rear wheels have a diameter and wherein the chassis has a width matching substantially the diameter of the rear wheels, wherein the chassis has a length that is approximately twice as long as the diameter of the rear wheels.

3. The carriage according to claim 1, wherein the means for securing are receptacles arranged on the chassis, wherein the halfshafts are insertable into the receptacles.

4. The carriage according to claim 3, wherein the halfshafts non-positively engage the receptacles.

5. The carriage according to claim 1, wherein the handlebar has an upper section and a lower section, wherein the handle is attached to the upper section, wherein the lower section is secured on the chassis, wherein the upper and lower sections in the transport state are folded onto the chassis and wherein the rear wheels in the transport state rest on the folded upper and lower sections.

6. The carriage according to claim 1, wherein the handlebar is pivotably supported on the chassis and, in the state of use, is secured without play on the chassis by a screw.

7. The carriage according to claim 6, wherein the screw is supported on the chassis so as to be pivotable out of an area of the handlebar.

8. The carriage according to claim 1, further comprising a frame element arranged on the chassis, wherein the at least three wheels include two front wheels secured on the frame element, wherein the frame element is supported on the chassis so as to be pivotable about a pivot axis extending transversely to a longitudinal direction of the chassis and is folded in the transport state toward the chassis.

9. The carriage according to claim 8, wherein the battery is removably arranged in the battery receptacle.

10. The carriage according to claim 9, wherein the battery receptacle has bow contacts on which poles of the battery are resting.

11. The carriage according to claim 9, wherein the means for securing are receptacles arranged on the chassis, wherein the halfshafts are insertable into the receptacles, the carriage further comprising a plug-in contact arranged on the chassis directly adjacent to one of the receptacles, wherein the battery is connectable to the electric motor via the plug-in contact.

12. The carriage according to claim 9, further comprising a substantially closed gearbox housing arranged on the chassis and a gearbox arranged in the gearbox housing and connected to the electric motor, wherein the carriage is driven by the gearbox that is driven by the electric motor.

13. The carriage according to claim 1, wherein at least one of the three wheels is provided with a freewheeling action in one rotational direction.

14. The carriage according to claim 1, wherein the chassis is formed of two bent sheet metal parts that are connected to one another by riveting.

15. The carriage according to claim 14, wherein a first one of the sheet metal parts forms a bottom element that is formed as a unitary part having a front wall and a back wall and wherein a second one of the sheet metal parts is a frame that forms a top side and sidewalls of the chassis.

16. The carriage according to claim 1, wherein the handlebar has an upper section and a lower section and an intermediate member connecting the upper and lower sections to one another, wherein the intermediate member is arranged laterally relative to a longitudinal extension of the handlebar, wherein a width of the intermediate member between the upper and the lower sections matches at least a diameter of the halfshafts, and wherein the intermediate member has means for securing the upper and lower sections in defined positions relative to one another.

17. The carriage according to claim 16, wherein the means for securing are receptacles arranged on the chassis, wherein the halfshafts are insertable into the receptacles, and wherein the width of the intermediate member matches an outer diameter of the receptacles.

18. The carriage according to claim 16, further comprising a support for supporting the container, wherein the support is secured on the intermediate member of the handlebar.

19. A carriage for transporting a container, the carriage comprising:
a chassis;
at least three wheels connected to the chassis for supporting the chassis, wherein the at least three wheels include two rear wheels;
a handlebar connected to the chassis for guiding the carriage in a state of use, wherein the carriage is convertible from the state of use into a transport state;
a handle connected to the handle bar;
wherein the rear wheels are provided with halfshafts that are fastened detachably on the chassis;
wherein the chassis has means for securing the rear wheels on the chassis in the transport state;
a frame element arranged on the chassis, wherein the at least three wheels include two front wheels secured on the frame element, wherein the frame element is supported on the chassis so as to be pivotable about a pivot axis extending transversely to a longitudinal direction of the chassis and is folded in the transport state toward the chassis;
an electric motor for driving the carriage and a battery that supplies the electric motor with energy, wherein the chassis has a battery receptacle and the battery is removably arranged in the battery receptacle;
a substantially closed gearbox housing arranged on the chassis and a gearbox arranged in the gearbox housing and connected to the electric motor, wherein the carriage is driven by the gearbox that is driven by the electric motor;
wherein the gearbox housing is formed by a cover arranged externally on the chassis and a lid arranged within the chassis.

20. A carriage for transporting a container, the carriage comprising:
a chassis;
at least three wheels connected to the chassis for supporting the chassis, wherein the at least three wheels include two rear wheels;
a handlebar connected to the chassis for guiding the carriage in a state of use, wherein the carriage is convertible from the state of use into a transport state;
a handle connected to the handle bar;
wherein the rear wheels are provided with halfshafts that are fastened detachably on the chassis;
wherein the chassis has means for securing the rear wheels on the chassis in the transport state;
a frame element arranged on the chassis, wherein the at least three wheels include two front wheels secured on the frame element, wherein the frame element is supported on the chassis so as to be pivotable about a pivot axis extending transversely to a longitudinal direction of the chassis and is folded in the transport state toward the chassis;
wherein the frame element has a support for the container, wherein the support for the container secures the battery in the transport state.

21. The carriage according to claim 20, wherein the frame element is secured without play in the state of use by being clamped with a screw on the chassis.

* * * * *